US009699670B2

(12) United States Patent
Cho et al.

(10) Patent No.: US 9,699,670 B2
(45) Date of Patent: Jul. 4, 2017

(54) METHOD FOR CONFIGURING INTERFACE IN MOBILE COMMUNICATION SYSTEM SUPPORTING MULTIPLE WIRELESS ACCESS TECHNOLOGIES AND APPARATUS FOR PERFORMING SAME

(71) Applicant: LG ELECTRONICS INC., Seoul (KR)

(72) Inventors: Heejeong Cho, Seoul (KR); Hyunsoo Ko, Seoul (KR); Genebeck Hahn, Seoul (KR); Hyeyoung Choi, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/913,316

(22) PCT Filed: Aug. 25, 2014

(86) PCT No.: PCT/KR2014/007876
§ 371 (c)(1),
(2) Date: Feb. 19, 2016

(87) PCT Pub. No.: WO2015/034197
PCT Pub. Date: Mar. 12, 2015

(65) Prior Publication Data
US 2016/0212635 A1 Jul. 21, 2016

Related U.S. Application Data

(60) Provisional application No. 61/873,799, filed on Sep. 4, 2013, provisional application No. 61/890,325, filed
(Continued)

(51) Int. Cl.
H04M 1/00 (2006.01)
H04W 24/02 (2009.01)
(Continued)

(52) U.S. Cl.
CPC ....... *H04W 24/02* (2013.01); *H04W 36/0022* (2013.01); *H04W 36/0083* (2013.01);
(Continued)

(58) Field of Classification Search
CPC ............. H04W 36/00; H04W 36/0005; H04W 36/0016; H04W 36/0022; H04W 36/0083;
(Continued)

(56) References Cited

U.S. PATENT DOCUMENTS

2007/0207815 A1  9/2007  Alfano et al.
2010/0105394 A1* 4/2010  Cheng ................... H04W 36/32
                                                    455/440
(Continued)

FOREIGN PATENT DOCUMENTS

KR    10-1040889      6/2011
KR    10-2013-0040242 4/2013

OTHER PUBLICATIONS

PCT International Application No. PCT/KR2014/007876, Written Opinion of the International Searching Authority dated Dec. 5, 2014, 18 pages.

*Primary Examiner* — Temica M Beamer
(74) *Attorney, Agent, or Firm* — Lee Hong Degerman Kang & Waimey

(57) ABSTRACT

A method for configuring an interface with APs of a second radio access technology (RAT) by an entity of a first RAT in a mobile communication system supporting multiple RAT according to an embodiment of the present invention comprises: transmitting a first message including a list of entity zones covered by the entity among a plurality of geographical zones; receiving a second message including a list of AP zones covered by the APs of the second RAT among the plurality of geographical zones in response to the first message; and configuring an interface with at least one AP
(Continued)

among the APs of the second RAT on the basis of the list of AP zones.

17 Claims, 12 Drawing Sheets

Related U.S. Application Data on Oct. 14, 2013, provisional application No. 61/894,430, filed on Oct. 23, 2013, provisional application No. 61/977,101, filed on Apr. 9, 2014.

(51) Int. Cl.
*H04W 92/20* (2009.01)
*H04W 36/00* (2009.01)
*H04W 64/00* (2009.01)
*H04W 88/10* (2009.01)

(52) U.S. Cl.
CPC ......... *H04W 64/003* (2013.01); *H04W 92/20* (2013.01); *H04W 88/10* (2013.01)

(58) Field of Classification Search
CPC ..... H04W 16/14; H04W 48/18; H04W 48/20; H04W 76/025; H04W 76/026; H04W 28/0226; H04W 88/00; H04W 88/06; H04W 88/08; H04W 88/10

USPC .... 455/436–438, 456.1, 456.5, 456.6, 552.1, 455/553.1

See application file for complete search history.

(56) References Cited

U.S. PATENT DOCUMENTS

| | | | |
|---|---|---|---|
| 2010/0215026 A1 | 8/2010 | Cheng et al. | |
| 2011/0014919 A1* | 1/2011 | Otte | H04W 36/0061 455/442 |
| 2011/0319076 A1 | 12/2011 | Ramasamy et al. | |
| 2012/0034878 A1* | 2/2012 | Findlay | H04W 36/0088 455/67.11 |
| 2013/0303199 A1* | 11/2013 | Siomina | H04W 64/00 455/456.5 |
| 2015/0016387 A1* | 1/2015 | Elmdahl | H04W 52/244 370/329 |
| 2015/0017986 A1* | 1/2015 | Koskinen | H04W 36/0083 455/436 |
| 2015/0057003 A1* | 2/2015 | Dwyer | H04W 36/0083 455/437 |
| 2015/0092686 A1* | 4/2015 | Cui | H04W 76/028 370/329 |

* cited by examiner (a)

(b)

(a)

(b)

(a)

(b)

METHOD FOR CONFIGURING INTERFACE IN MOBILE COMMUNICATION SYSTEM SUPPORTING MULTIPLE WIRELESS ACCESS TECHNOLOGIES AND APPARATUS FOR PERFORMING SAME

CROSS-REFERENCE TO RELATED APPLICATIONS

This application is the National Stage filing under 35 U.S.C. 371 of International Application No. PCT/KR2014/007876, filed on Aug. 25, 2014, which claims the benefit of U.S. Provisional Application Nos. 61/873,799, filed on Sep. 4, 2013, 61/890,325, filed on Oct. 14, 2013, 61/894,430, filed on Oct. 23, 2013 and 61/977,101, filed on Apr. 9, 2014, the contents of which are all hereby incorporated by reference herein in their entirety.

TECHNICAL FIELD

The present invention relates to a method of configuring an interface between network entities of a mobile communication system supporting Multi-RAT and an apparatus performing the same.

BACKGROUND ART

A study on Multi-RAT (radio access technology) in which heterogeneous communication networks are managed in a manner of being integrated with each other has been performed. For example, a multi-RAT terminal supports both a cellular network and a wireless LAN. The multi-RAT terminal is able to selectively access a single RAT only among a plurality of RATs and is unable to access a plurality of the RATs at the same time. In particular, although a terminal has multi-RAT capability, the terminal is unable to transmit and receive data at the same time through RATS different from each other. In particular, it is necessary to newly define an interface configuration between network entities of RATs different from each other to support multi-RAT capability of a terminal.

DISCLOSURE OF THE INVENTION

Technical Task

A technical task of the present invention is to provide a method of efficiently configuring and updating an interface between network entities belonging to RATs different from each other to support a multi-RAT terminal and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of configuring an interface, which is configured by an entity of a first RAT with APs of a second RAT in a mobile communication system supporting a multi-RAT (radio access technology), includes transmitting a first message including a list of entity areas covered by the entity among a plurality of geographical zones, receiving a second message including a list of AP areas covered by the APs of the second RAT among a plurality of the geographical zones in response to the first message, and configuring an interface with at least one AP among the APs of the second RAT based on the list of the AP areas.

To further achieve these and other advantages and in accordance with the purpose of the present invention, according to a different embodiment, an entity of a first RAT in a mobile communication system supporting a multi-RAT (radio access technology) includes a transmitter configured to transmit a first message including a list of entity areas covered by the entity among a plurality of geographical zones, a receiver configured to receive a second message including a list of AP areas covered by APs of a second RAT among a plurality of the geographical zones in response to the first message and a processor configured to set an interface with at least AP among the APs of the second RAT based on the list of the AP areas.

Preferably, it is able to select an AP to which the interface is to be set according to whether or not at least a part of the AP areas is overlapped with the entity areas.

And, the first message can further include identifier information of the entity and type information of the entity. The type information of the entity can indicate one of a first type supporting the first RAT only, a second type supporting both the first RAT and the second RAT, a third type physically connected with the APs of the second RAT while supporting the first RAT only and a fourth type physically connected with the APs of the second RAT while supporting both the first RAT and the second RAT.

And, it is able to reconfigure the interface with the APs according to a change of a position of the entity areas or a position of the AP areas. For example, if a first area is added to the entity areas, it is able to configure an interface with an AP covering the first area among the APs. If a second area is excluded from the entity areas, it is able to release an interface with an AP covering the second area among the APs.

And, if an interface with a first AP is released due to reconfiguration of the interface, it is able to request a measurement report on the first RAT to a UE receiving a service from the entity and the first AP. When the measurement report is requested to the UE, it is able to transmit information on a different entity of the first RAT to which the interface with the first AP is set to the UE. It is able to indicate the UE to make handover to a different entity of the first RAT based on the measurement report received from the UE.

Advantageous Effects

According to one embodiment of the present invention, it is able to support a multi-RAT terminal by configuring an interface between network entities belonging to RATs different from each other and it is able to efficiently configure and update an interface configuration because an interface configuration with a mobility management entity and an interface configuration with heterogeneous network entities can be performed at the same time.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
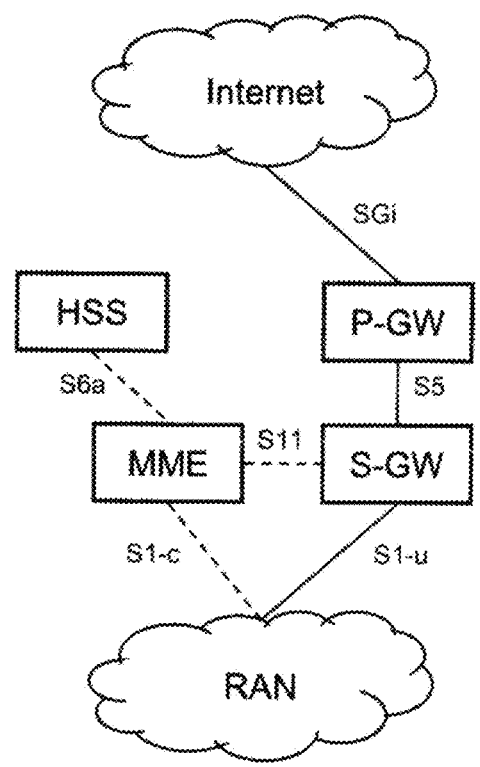
FIG. 1 is a diagram for a network structure of 3GPP.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams. And, an identical drawing symbol is used for an identical configuration element throughout the present specification.

In the following description, a first RAT corresponds to a cellular system or a cellular network. For example, assume that the first RAT corresponds to 3GPP LTE, LTE-A system. Yet, the first RAT can be implemented by a random different cellular system except a unique item of 3GPP LTE, LTE-A.

A second RAT corresponds to a wireless communication system or a wireless communication network using a wireless communication scheme different from the first RAT. The second RAT may correspond to a system for transmitting data while including coverage relatively smaller than coverage of the first RAT. For example, the second RAT may correspond to a wireless LAN system such as WLAN or WiFi, by which the present invention may be non-limited.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a first RAT or a second RAT communicating with a terminal as a Node B (NB), an eNode B (eNB), an access point (AP) and the like. In the following descriptions, assume that an AP (access point) of a second RAT is a common name of a random node of the second RAT communicating with a terminal.

In the first RAT, a user equipment can receive information from a base station in downlink and the user equipment can transmit information to the base station in uplink. The information transmitted or received by the user equipment includes data and various control information and various physical channels may exist according to a type and usage of the information transmitted and received by the user equipment.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

An STA (station) includes an AP STA and a non-AP STA. The non-AP STA corresponds to such a device directly handled by a user as a laptop computer and a mobile phone. The non-AP STA can also be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS and the like in a different wireless communication field.

Specific terms are employed in the following description for better understanding of the present invention. Such specific terms may take other forms within the technical scope or spirit of the present invention.

FIG. 1 is a diagram for a network structure of 3GPP. In 3GPP, a RAN (radio access network) and a CN (core network) are functionally separated from each other. This type of core network structure is called EPC (evolved packet core). When LTE RAN and the EPC are combined with each other, the system is called an EPS (evolved packet system).

For example, the RAN is in charge of a wireless-related function such as scheduling, radio resource management, retransmission protocol, channel coding, various multiple antennas schemes and the like.

Although the EPC is not relevant with a radio interface, the EPC is in charge of such a function as authentication, charge, end-to-end connection establishment and the like necessary for providing overall mobile broadband network. Since it is able to manage a plurality of radio access technologies in a single core network, it may be more profitable to separate the functions from each other compared to a case that the functions are added to the RAN.

An MME (mobility management entity) corresponds to a node managing a control plane in the EPC and the MME is in charge of connecting and releasing a bearer with a terminal, switching to an active state from an idle state, and managing a security key and the like.

An S-GW (serving gateway) corresponds to a node in charge of a user plane in the EPC. The S-GW plays a role of a mobility anchor when a terminal moves around among eNode Bs.

A PDN-GW (packet data network gateway) connects the EPC to the internet.

The PDN-GW is in charge of a function of assigning an IP address to a specific terminal, a function of applying QoS (quality of service) according to a policy controlled by PCRF and the like. And, the P-GW plays a role of a mobility anchor in a movement with a network except 3GPP radio access technology connected with the EPC.

In addition, the EPC includes nodes such as a PCRF (policy and charging rules function) in charge of QoS management and charge and an HSS (home subscriber service) including subscriber information.

Figure 2:
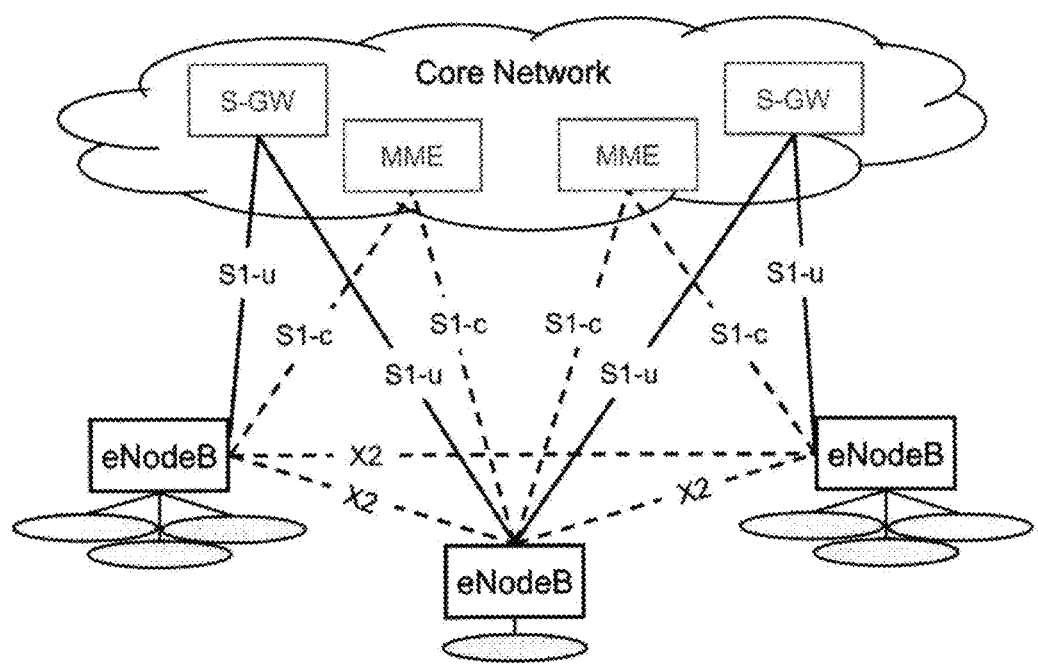
FIG. 2 is a diagram for a wireless network interface of 3GPP.

FIG. 2 is a diagram for a wireless network interface of 3GPP.

An eNode B is connected with EPC through S1 interface. An eNode B is connected with an S-GW through an S1 user-plane (i.e., S1-u interface) and an eNode B is connected with an MME through an S1 control-plane (i.e., S1-c interface). Moreover, an eNode B can be connected with a plurality of MMEs/S-GWs for the purpose of load distribution and redundancy.

eNode Bs are connected with each other through an X2 interface. The X2 interface is also used for supporting lossless mobility between neighboring cells through packet forwarding.

FIGS. 3 to 6 are diagrams for a radio entity according to embodiments of the present invention. According to one embodiment of the present invention, an RE (radio entity) 300 is newly defined to support multi-RAT capability of a UE. Since an RE is based on a first RAT, the RE basically supports a cellular network access technology. For example, in case of 3GPP, the RE can include all functions of a legacy eNB. Meanwhile, it may be able to define a plurality of RE types according to a scheme of supporting multi-RAT capability.

Figure 3:
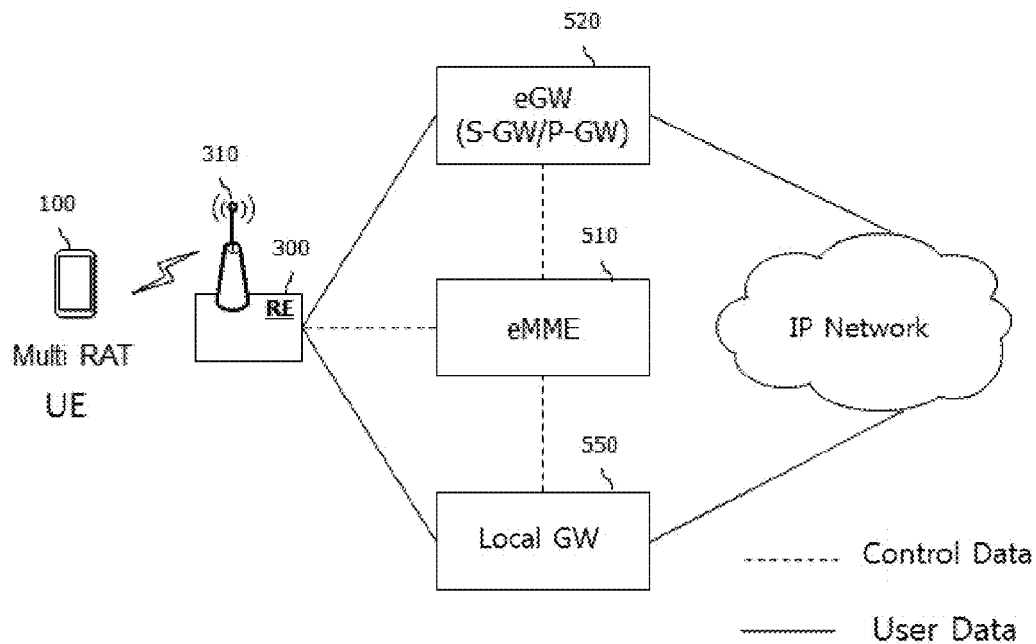
FIGS. 3 to 6 are diagrams for a radio entity according to embodiments of the present invention.

FIG. 3 shows an RE of a first type. The RE 300 of the first type supports a first RAT (e.g., a small-scale cell base station) 310 only. In this case, the RE 300 of the first type and a cellular base station (e.g., small-scale cell base station) can be implemented as a single entity. The RE 300 of the first type is connected with an eGW 520 and a local GW 550 to transmit and receive user data. The RE is connected with an eMME 510 to transmit and receive control data. The eGW 520 can perform at least one of S-GW function and P-GW function. The local GW 550 corresponds to a gateway for accessing a home network.

Figure 4:
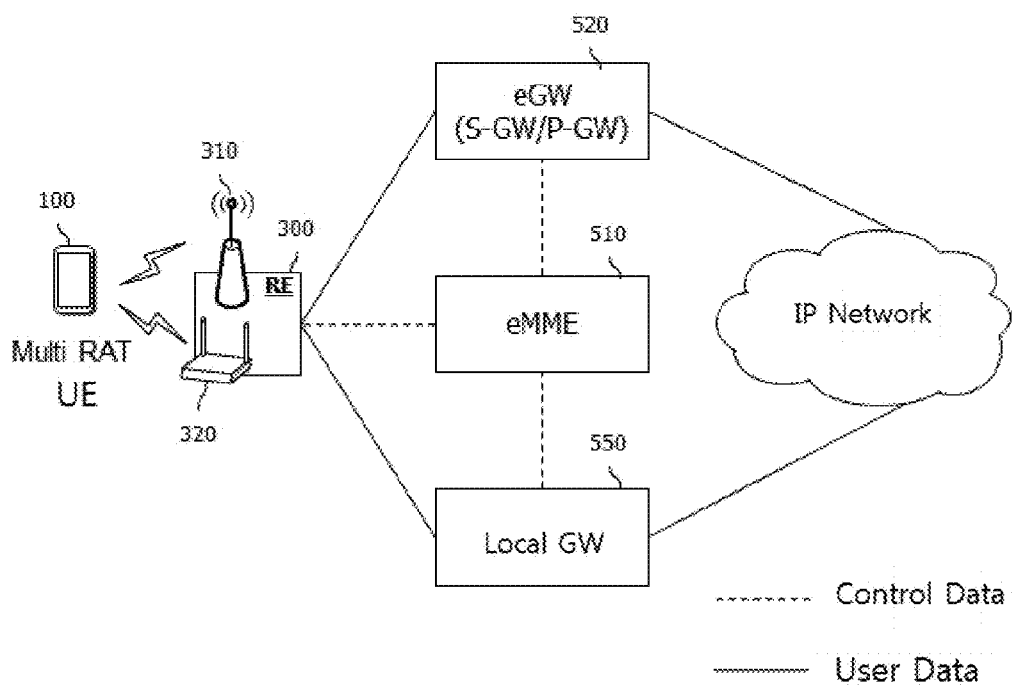

FIG. 4 shows an RE of a second type. The RE 300 of the second type supports both a first RAT and a second RAT. In this case, the RE 300 of the second type can be implemented as a single device including a base station 310 of the first RAT and an AP 320 of the second RAT.

Figure 5:
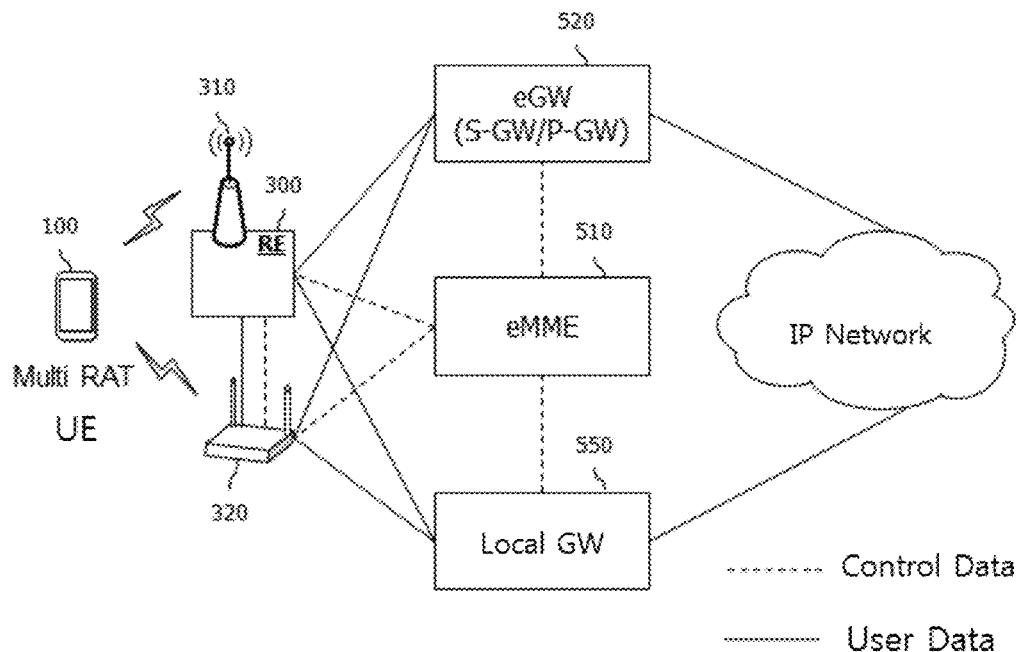

FIG. 5 shows an RE of a third type. The RE 300 of the third type supports a first RAT and the RE is physically connected with an AP 320 of a second RAT.

Figure 6:
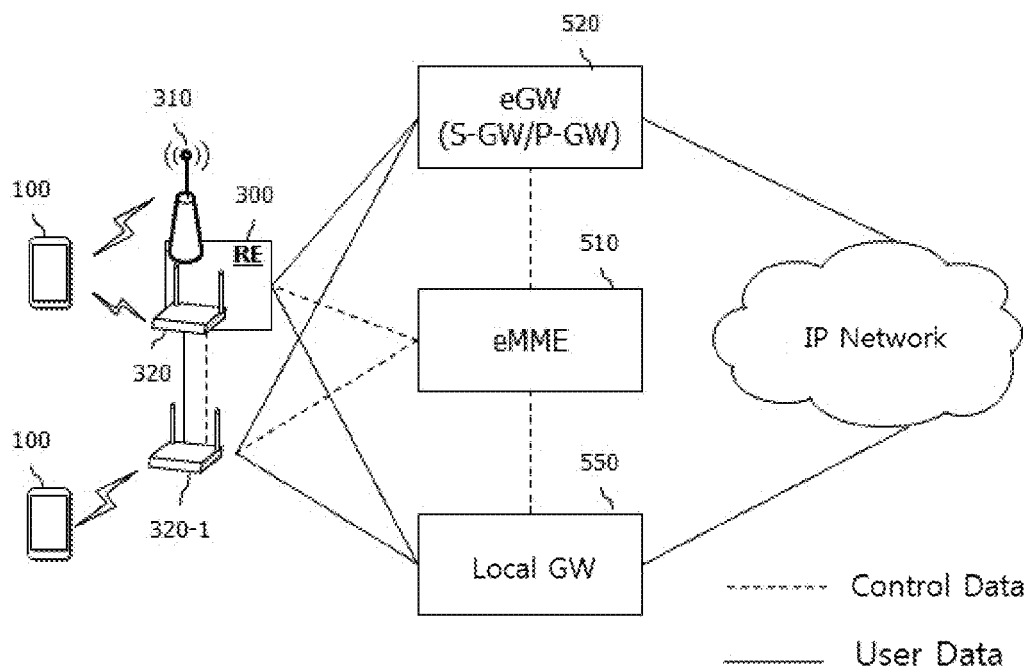

FIG. 6 shows an RE of a fourth type. The RE 300 of the fourth type corresponds to a concept that the RE of the second type and the RE of the third type are mixed. The RE 300 of the fourth type supports both the first RAT and the second RAT and the RE is physically connected with an externally positioned AP 320-1 of the second RAT.

Meanwhile, in order to use and control a physical connection between the RE of the second type or the third type and the AP of the second RAT, it is required to configure a logical interface. And, it is required for an eMME to have an interface for controlling the AP of the second RAT in multi-RAT environment. The aforementioned interfaces can be newly defined according to embodiment of the present invention. An interface between an RE and an AP is referred to as an X2-eAP interface and an interface between an eMME and an AP is referred to as an S21-eMME interface.

As shown in Table 1 in the following, the aforementioned REs of the first to the fourth type can be used according to the number of first RAT base station and the number of second RAT AP.

TABLE 1

| Number of first RAT base station | Number of AP | Type of RE | Applicable scenario |
|---|---|---|---|
| 1 | 1 | First type Second type | Small-scale cell coverage |
| 1 | N | First type Second type Third type | Macro cell coverage |
| N | 1 | First type or second type | X2 interface utilization |
| N | N | Third type | |

Figure 7:
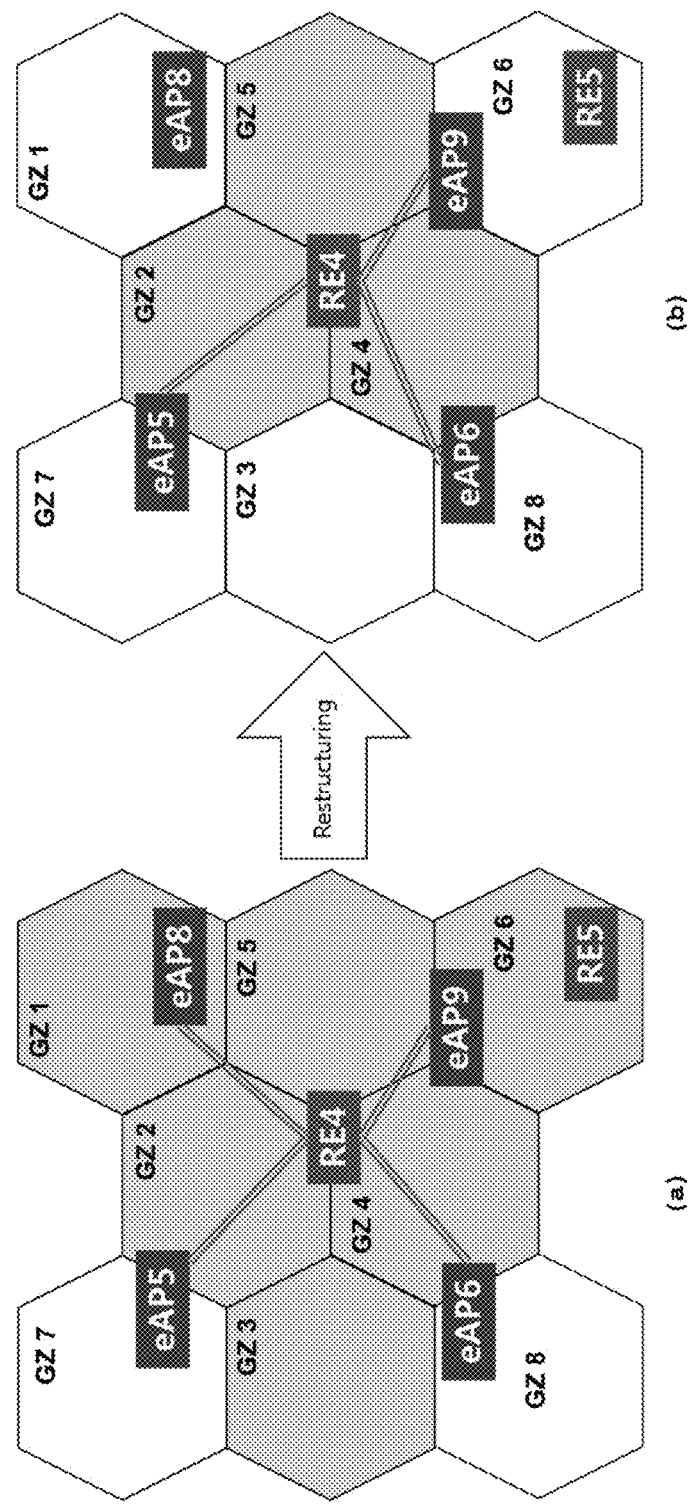
FIG. 7 is a diagram for a geographical zone configuration according to one embodiment of the present invention.

FIG. 7 is a diagram for a geographical zone configuration according to one embodiment of the present invention.

According to one embodiment of the present invention, it is able to partition a plurality of geographical zones (GZs) in a network deployment process. It is able to allocate at least one or more GZs respectively covered by an RE of a first RAT and an AP of a second RAT according to a position of the RE of the first RAT and a position of the AP of the second RAT. It is able to define a GZ in a manner of being identical to cell coverage or a TA (tracking area) of the legacy first RAT, by which the present invention may be non-limited. An identifier can be assigned to each of a plurality of the GZs. The GZ identifier may correspond to a unique identifier in overall system or a unique identifier in eMME unit. In the following description, for clarity, a GZ assigned to the RE of the first RAT is referred to as an RE area and a GZ assigned to the AP of the second RAT is referred to as an AP area. A GZ may belong to both the RE area and the AP area. For example, 6 GZs (GZ 1 to GZ 6) are assigned to an RE 4 in FIG. 7 (a). 2 GZs (GZ 2 and GZ 7) are assigned to an eAPS. In this case, the GZ 2 belongs to an AP area of the eAPS as well as an RE area of the RE 4.

An OAM (Operations, Administration and Maintenance) server or a SON (Self Organizing Network) server can perform network restructuring in response to GZ assignment according to a system situation. As mentioned in the following description, a second type RE or a third type RE can reconfigure (new configuration, release of legacy configuration) an interface with APs of the second RAT according to changed GZ assignment. For example, referring to FIG. 7 (b), a GZ 3, a GZ 1 and a GZ 6 are excluded from an RE area of the RE 4.

Figure 8:
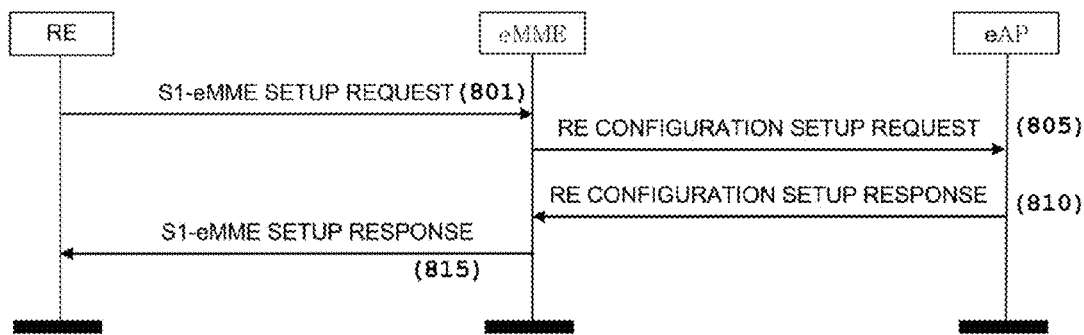
FIG. 8 is a flowchart for a method of configuring an X2-eAP interface according to one embodiment of the present invention.

FIG. 8 is a flowchart for a method of configuring an X2-eAP interface according to one embodiment of the present invention.

First of all, an RE of a first RAT transmits an S1-eMME setup request message to an eMME [S801]. The S1-eMME setup request message corresponds to a message for requesting S1-eMME interface setup between the RE and the eMME. The S1-eMME setup request message can include information on an S1-eMME interface and information on X2-eAP interface configuration. The RE can ask the eMME to configure an X2-eAP interface in a manner of transmitting the information on the X2-eAP interface configuration to the eMME via the S1-eMME setup request message. For example, the S1-eMME setup request message can include at least one selected from the group consisting of RE identifier information (e.g., global RE ID), PLMN (public land mobile network) ID, RE type—type 2 or 3, an X2-eAP setup request indicator and a GZ list. The X2-eAP setup request indicator corresponds to information indicating that the RE is requesting the X2-eAP interface configuration via the S1-eMME setup request message. The GZ list corresponds to a list of identifiers of GZs covered by the RE.

If the X2-eAP setup request indicator is deactivated, the eMME configures an S1-eMME interface only and transmits an X2-AP setup response message in response to the S1-eMME setup request [S815].

On the contrary, if the X2-eAP setup request indicator is activated, the eMME transmits an RE configuration setup request message to an eAP [S805]. The RE configuration setup request message corresponds to a message for requesting or indicating the eAP to configure an X2-eAP interface with the RE. The RE configuration setup request message can include at least one selected from the information received from the RE consisting of RE identifier information (e.g., global RE ID), PLMN (public land mobile network) ID, RE type=type 2 or 3, an X2-eAP setup request indicator and a GZ list.

The eAP is able to know an RE area of the RE through the received GZ list. The eAP compares the RE area and an AP area of the eAP with each other. If at least a part of the AP area and the RE area are overlapped with each other, the eAP determines to configure an X2-eAP interface with the RE. On the contrary, if the AP area and the RE area are not overlapped with each other, the eAP determines it as it is unable to configure the X2-eAP interface.

The eAP transmits a determination result for whether to configure the X2-eAP interface through an RE configuration setup response message. The RE configuration setup response message can include information on the eAP necessary for the RE to configure the X2-eAP interface. For example, the RE configuration setup response message can include heterogeneous RE type=Wi-Fi, an AP identifier (IP address, SSID, BSSID, HESSID), a GZ list of an AP, Wi-Fi AP configuration (frequency channel—operating class, channel number, beacon-related information—beacon interval, mobility capability, etc.), by which the present invention may be non-limited.

According to a different embodiment of the present invention, the eMME compares the RE area of the RE and the AP area of the eAP with each other and may be able to determine whether to configure the X2-eAP interface with the RE. If it is determined not to configure the X2-eAP interface, the step S805 and the step S810 are omitted. If it is determined not to configure the X2-eAP interface, the RE configuration setup request message corresponds to a message for indicating the eAP to configure the X2-eAP interface.

Figure 9:
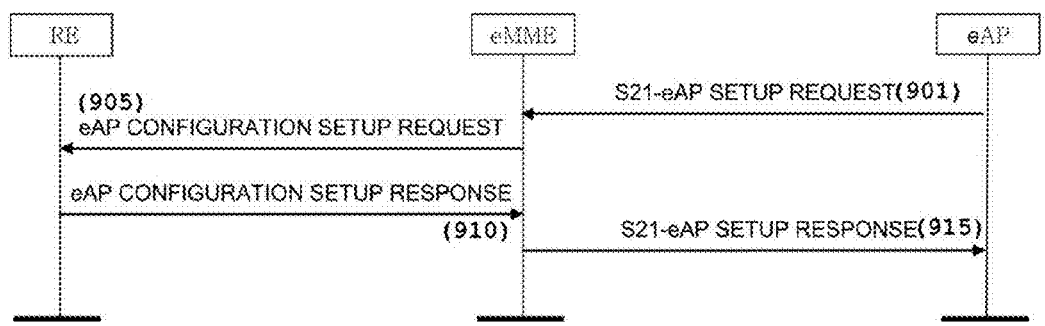
FIG. 9 is a flowchart for a method of configuring an X2-eAP interface according to a different embodiment of the present invention.

The eMME transmits an S1-eMME setup response message to the RE [S815]. If the S1-eMME setup response message is received, the S1-eMME interface configuration is completed. The S1-eMME setup response message can include not only information on an S1-eMME interface but also information on an X2-eAP interface configuration. For example, if it is determined to configure the X2-eAP interface by the eAP or the eMME, the S1-eMME setup response message can include information on the eAP necessary for the RE to configure the X2-eAP configuration. On the contrary, if it is determined not to configure the X2-eAP interface by the eAP or the eMME, the S1-eMME setup response message can include information indicating rejection for the X2-eAP interface configuration request of the RE FIG. 9 is a flowchart for a method of configuring an X2-eAP interface according to a different embodiment of the present invention. Explanation on contents overlapped with FIG. 8 is omitted. FIG. 9 is explained centering on a difference with the embodiment of FIG. 8.

Although the S1-eMME setup request is transmitted by the RE in the embodiment of FIG. 8, the eAP transmits an S21-eAP setup request message in an embodiment of FIG. 9 [S901]. The S21-eAP setup request message can include at least one selected from the group consisting of Heterogeneous RE type=Wi-Fi AP indicating that the eAP corresponds to an AP of the second RAT, an AP identifier (IP address, SSID, BSSID, HESSID, global E-AP ID), an X2-eAP setup request indicator, a GZ list of an AP, Wi-Fi AP configuration (frequency channel—operating class, channel number, beacon-related information—beacon interval, mobility capability indicating fixed/mobile, closed/open subscriber group indicating whether a limited user is available only, load, interference, power (on/off, level)-related information).

The eMME transmits an eAP configuration setup request message to the RE [S905]. The RE determines whether to configure an X2-eAP interface and transmits an eAP configuration setup response message to the eMME [S910]. If it is determined to configure the X2-eAP interface, the eAP configuration setup response message can include at least one selected from the group consisting of an RE identifier (e.g., global RE ID), PLMN ID, RE type=type 2 or 3, a GZ list. The eMME transmits an S21-eAP setup response message to the eAP [S915].

Figure 10:
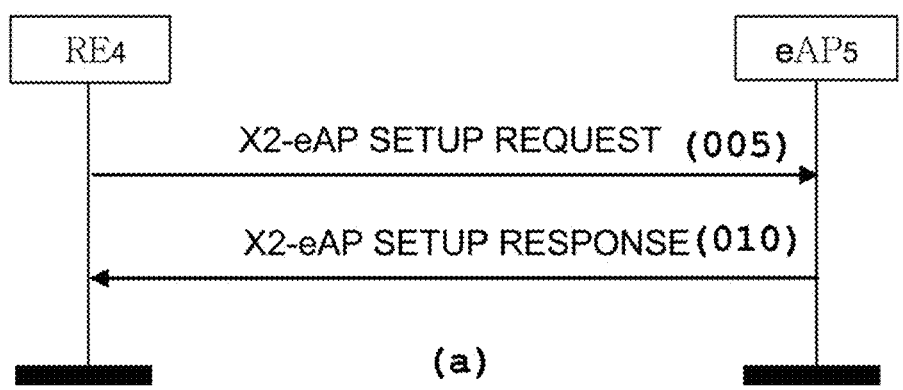
FIG. 10 is a flowchart for a method of configuring an X2-eAP interface according to a further different embodiment of the present invention.
Figure 10:
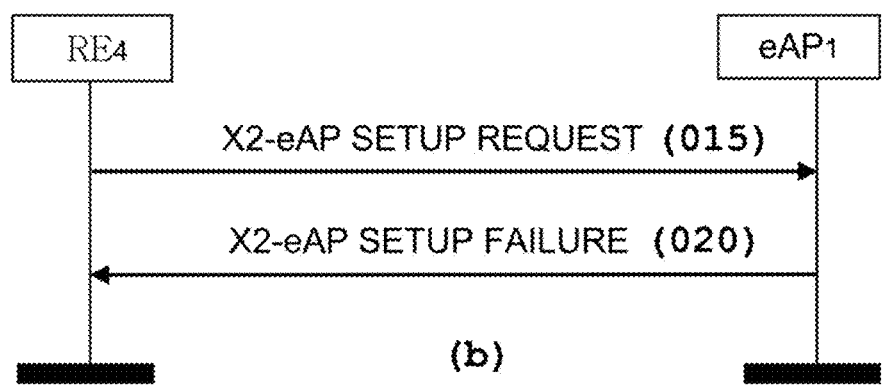

FIG. 10 is a flowchart for a method of configuring an X2-eAP interface according to a further different embodiment of the present invention. FIG. 10 (a) or (b) can be performed in a manner of being contiguous with the embodiment of FIG. 8 or FIG. 9 or can be performed as a separate embodiment. FIG. 10 (a) shows a case that the RE 4 of FIG. 7 transmits an X2-eAP setup request to an eAP 5 and FIG. 10 (b) shows a case that the RE 4 of FIG. 7 transmits an X2-eAP setup request to an eAP 1.

Referring to FIG. 10 (a), the RE 4 transmits an X2-eAP setup request to an eAP 5 [S005]. The RE 4 transmits an RE type of the RE 4, an identifier (e.g., global RE ID), a PLMN ID, an eMME group ID, an RE area (GZ 1, 2, 3, 4, 5, and 6) and the like through the X2-eAP setup request.

Having received the X2-eAP setup request, the eAP 5 compares an AP area (GZ 2, 7) of the eAP 5 and the RE area (GZ 1, 2, 3, 4, 5 and 6) with each other. Since a GZ 2 belongs to both the AP area and the RE area, the eAP 5 determines to configure an X2-eAP interface with the RE 4. Meanwhile, it may consider a PLMN ID and an eMME group ID together. For example, the eAP 5 can consider whether or not the RE 4 belongs to an eMME identical to an eMME to which the eAP 5 belongs thereto. Subsequently, the eAP 5 transmits an X2-eAP setup response message to the RE 4 [S010].

Referring to FIG. 10 (*b*), the RE 4 transmits an X2-eAP setup request to an eAP 1 [S015].

Having received the X2-eAP setup request, the eAP 1 compares an AP area (GZ 10) of the eAP 1 and the RE area (GZ 1, 2, 3, 4, 5 and 6) with each other. Since there is no overlapped part between the AP area and the RE area, the eAP 1 determines not to configure an X2-eAp interface with the RE 4. Meanwhile, if the RE 4 belongs to an eMME different from an eMME to which the eAP 1 belongs thereto, the eAP 1 can also determine not to configure the X2-eAP interface with the RE 4. Subsequently, the eAP 1 transmits an X2-eAP setup failure message to the RE 4 [S020].

Figure 11:
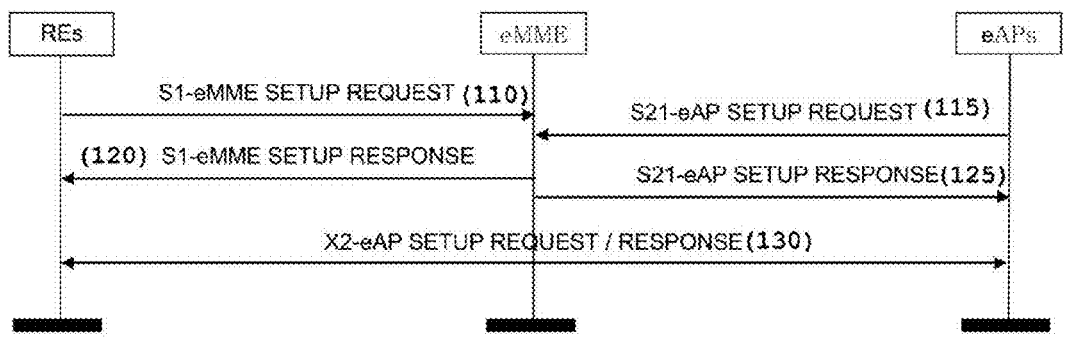
FIG. 11 is a flowchart for a method of configuring an X2-eAP interface according to a further different embodiment of the present invention.

FIG. 11 is a flowchart for a method of configuring an X2-eAP interface according to a further different embodiment of the present invention. Explanation on a part overlapped with the aforementioned contents is omitted.

First of all, an eMME receives an S1-eMME setup request message from an RE [S110] and receives an S21-eAP setup request message from an eAP [S115]. The eMME can obtain information on an RE area and information on an AP area from the S1-eMME setup request message and the S21-eAP setup request message. The eMME can determine a pair between an RE to which an X2-eAP interface is required to be set and an AP in a manner of comparing the RE area and the AP area with each other.

The eMME transmits an S1-eMME setup response message to the RE [S120] and transmits an S21-eAP setup response message to the eAP [S125]. If X2-eAP interface configuration is required, the X2-eAP interface configuration can be indicated to the RE and the eAP, respectively. For example, an S1-eMME setup response can include an identifier of the eAP becoming a target of the X2-eAp interface configuration and an AP area (GZ list). And, an S21-eMME setup response can include identifier of the RE and an RE area (GZ list).

The eMME can indicate the X2-eAP interface configuration to the RE and the AP through an S1-eMME interface configuration process and an S21-eMME interface configuration process, respectively.

The RE and the AP exchange an X2-eAP setup request/response message with each other according to the indication of the eMME [S130].

Figure 12:
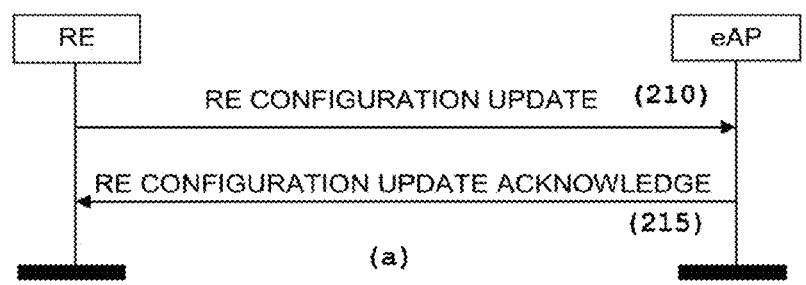
FIG. 12 is a flowchart for a method of updating an X2-eAP interface configuration according to one embodiment of the present invention.
Figure 12:
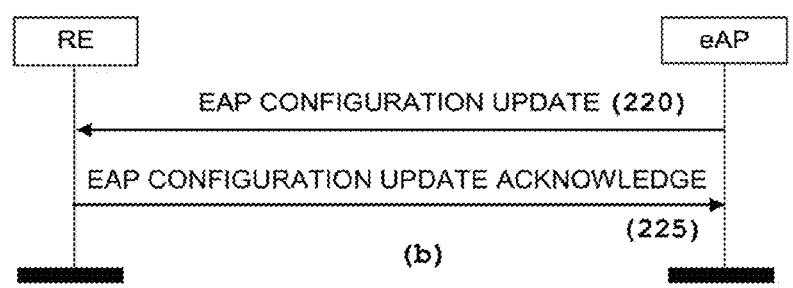

FIG. 12 is a flowchart for a method of updating an X2-eAP interface configuration according to one embodiment of the present invention. FIG. 12 (*a*) shows a case that an X2-eAP interface configuration is updated according to a request of an RE and FIG. 12 (*b*) shows a case that an X2-eAP interface configuration is updated according to a request of an AP. As shown in FIG. 7, the update of the X2-eAP interface configuration can be performed according to network restructuring (change of an RE area or an AP area).

In FIG. 12 (*a*), as shown in FIG. 7 (*b*), assume that network restructuring has been performed. An RE 4 transmits information on a changed RE area (GZ 2, 4 and 5) and the like to an eAP of which an X2-eAP interface is configured with the RE 4 through an RE CONFIGURATION UPDATE [S210]. In this case, if a new eAP is added to the RE area according to the update of the RE area, a procedure for newly configuring the X2-eAP interface is performed on the new eAP. And, it may also be able to perform a CONFIGURATION UPDATE procedure on an S1-eMME.

Having received the RE CONFIGURATION UPDATE, eAPs (e.g., an eAP 5, 6 and 9) update the information on the RE area. Since control controlled by the RE and the X2-eAP interface is not required anymore due to the change of the RE area, an eAP 8 releases or deactivates the X2-eAP interface.

In FIG. 12 (*b*), assume that an AP area of an eAP has been changed. The eAP transmits an eAP configuration update message to an RE of which an X2-eAP interface is configured with the eAP [S220] and receives a response from the RE [S225].

Figure 16:
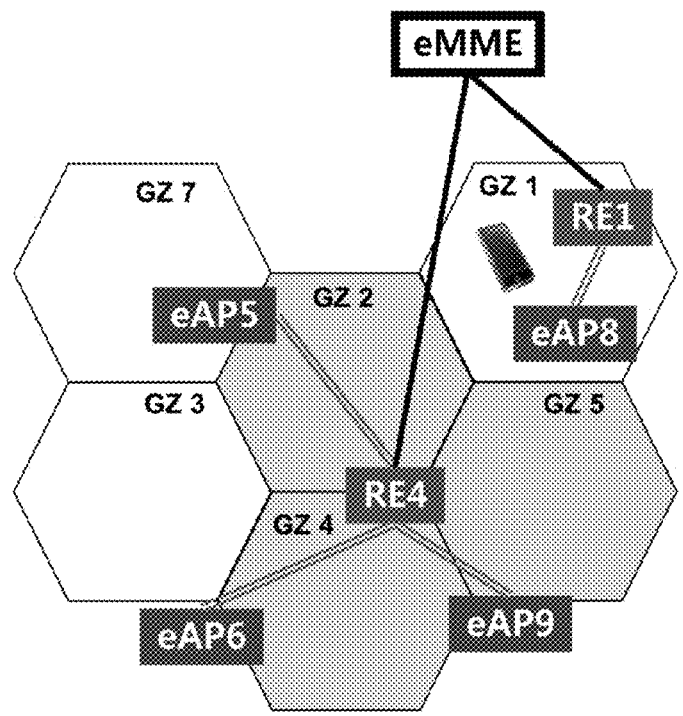
FIG. 16 is a diagram for a geographical area configuration according to a different embodiment of the present invention.

Meanwhile, in FIG. 7 (*a*), network restructuring can be performed as shown in FIG. 16. In particular, an RE 1 is added and the RE 1 has a GZ 1 as an RE area. The RE 1 may correspond to an RE including mobility.

In this case, an X2-eAP interface is generated between the RE 1 and an eAP 8. Meanwhile, a measurement report on a first RAT may be requested to a UE(s) receiving a service from an RE and an AP in which an X2-eAP configuration change is to be made (e.g., RE 4 and eAP 8). In particular, the RE 4 asks the UE to make a measurement report on the first RAT (e.g., cellular system). The RE 4 can provide a list of all REs of which the X2-eAP interface is configured with the eAP 8 to the UE while requesting the measurement report to the UE. The RE 4 can receive the measurement report through the first RAT. If the first RAT is in an idle state, the RE 4 can receive the measurement report via a second RAT. The RE 4 can determine whether to make the UE make a handover based on the measurement report. For example, if the UE is in an active state for the first RAT and quality of a measurement report on an RE 1 is relatively good, the RE 4 can determine to make the UE make a handover to the RE 1.

The RE 4 can inform the eMME and a target RE (e.g., RE 1) of the handover of the UE. For example, the RE 4 can transmit and receive a serving RE change request/response message. The message can be transceived between the eAP and the eMME using an S21-eMME interface, can be transceived between the serving RE 4 and the eMME using an S1-eMME interface or can be transceived between the serving RE 4 and the target RE 1 using an X2-RE interface. Meanwhile, if the UE is in an active state for the first RAT, the UE can make a handover to the RE 1 using a general handover message. If it is determined as quality of the RE 4 is better than quality of the RE 1 based on the measurement report, handover can be omitted. As mentioned in the foregoing description, the X2-eAP interface configuration between the RE 4 and the eAP8 is changed or released.

Figure 13:
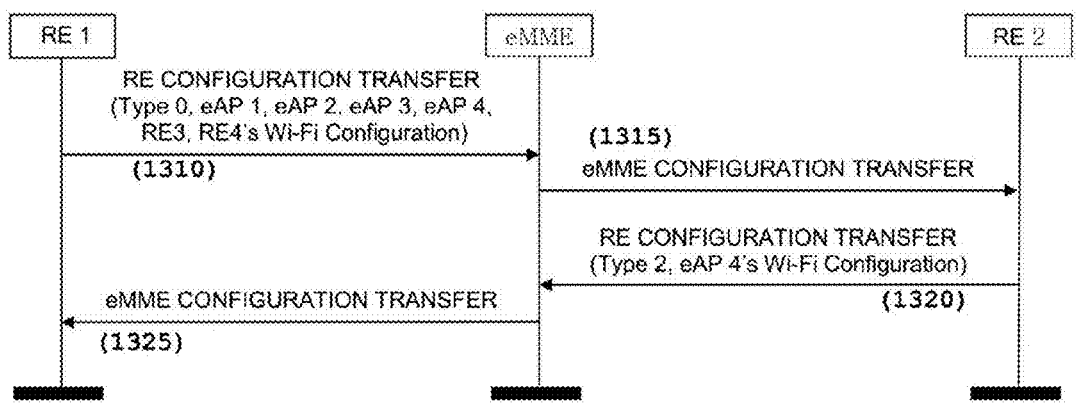
FIG. 13 is a flowchart for a method of delivering RE information according to one embodiment of the present invention.
Figure 14:
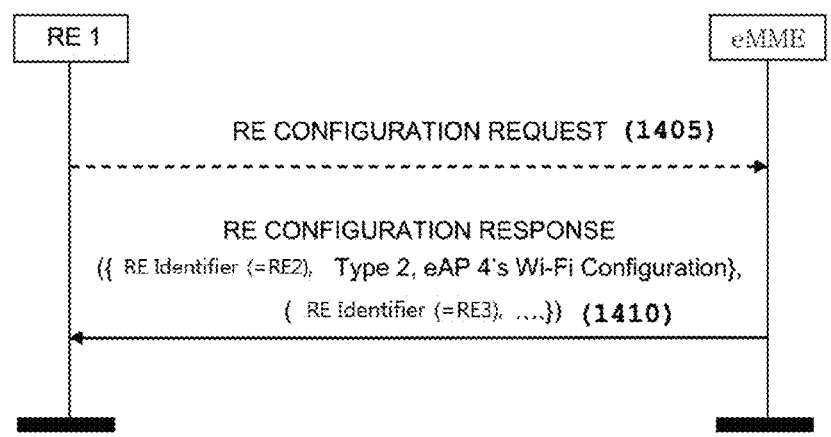
FIG. 14 is a flowchart for a method of delivering RE information according to a different embodiment of the present invention.
Figure 15:
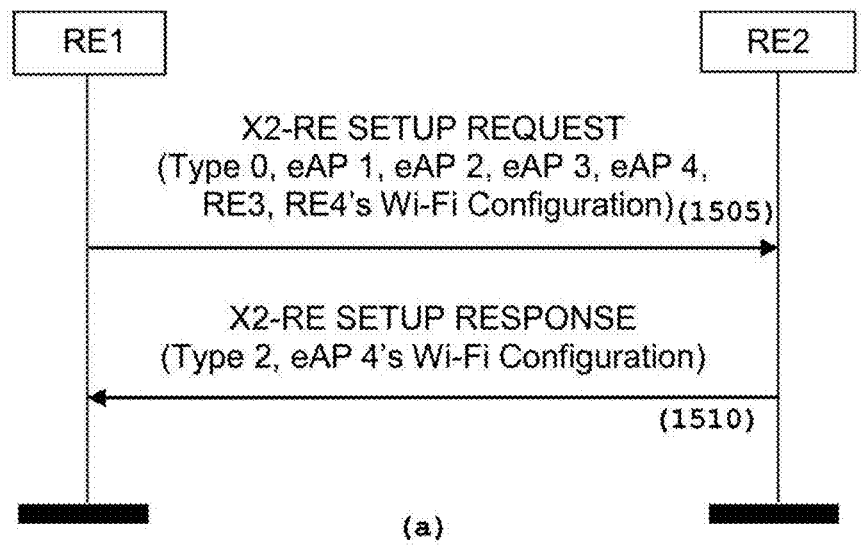
FIG. 15 is a flowchart for a method of delivering RE information according to a further different embodiment of the present invention.
Figure 15:
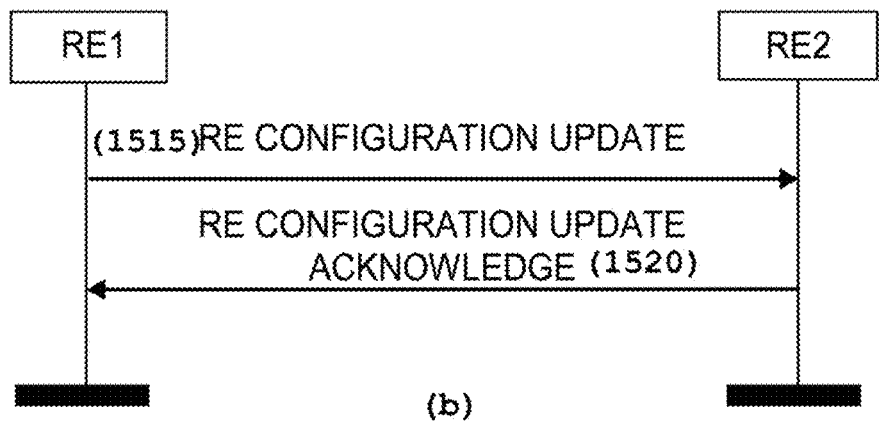

In the foregoing description, although an interface configuration and information transceived between an RE and an eAP have been discussed, information of an RE can be exchanged between an RE and an RE. An interface between an RE and an RE can be referred to as an X2-RE interface. FIGS. 13 to 15 show RE information exchanged between an RE and an RE.

RE information exchanged between REs can include information described in the following, by which the present invention may be non-limited.

1. RE type
  Type 0: General cellular radio entity (e.g., Legacy eNB)
  Type 1: Physically collocated Multi-RAT radio entity
  Type 2: Physically connected Multi-RAT radio entity
  Type 3: Hybrid Multi-RAT radio entity
2. RE mobility capability
  Mode 1: Fixed RE
  Mode 2: Mobile RE
3. Wi-Fi configuration (One or more Wi-Fi information controlled by Multi-RAT RE)
  Number of Wi-Fi NWs
  Index, identifier—IP address, SSID, BSSID, HESSID
  Whether it is available for a limited user only—closed/open subscriber group
  Frequency channel—operating class, channel number
  Beacon-related information—beacon interval
  Load, Interference, Power (on/off, level)-related information
  mobility capability—Fixed/Mobile Referring to FIG. 13, it shows a method that an RE 1 delivers RE information of the RE 1 to an RE 2 through an eMME. The RE 1 transmits an RE configuration transfer message to the eMME [S1310]. The RE configuration transfer message can include type information of the RE 1, information on APs to which the X2-eAP interface is set, information on a different RE and second RAT configuration information.

The eMME delivers RE information received from the RE 1 via the eMME configuration transfer message to an RE 2 [S1315].

The RE 2 receives RE 1 information and transmits RE 2 information to the eMME in response to the RE 1 information [S1320]. Subsequently, the eMME transmits the RE 2 information to the RE 1 [S1325].

The aforementioned RE configuration delivery procedure is used for delivering a RAN configuration to the eMME from an RE. The eMME delivers the RAN configuration information to the RE 2 without interpreting the RAN configuration information.

An eMME configuration transfer delivery is used for delivering the RAN configuration information to an RE from the eMME. The procedure can be performed via signaling irrespective of a UE.

FIG. 14 shows a procedure for an eMME to transmit information on a different RE to an RE 1. The information on the different RE is transmitted upon a request of the RE 1 or the transmission of the information on the different RE can also be performed without a request.

The RE 1 transits an RE configuration request message to the eMME [S1405]. The eMME transmits an RE configuration response message to the RE 1 [S1410]. The RE configuration response message can include an identifier of the different RE, a type, and second RAT configuration information of a connected AP. In this case, the eMME may correspond to a main entity for managing AP information.

FIG. 15 shows direct exchange of RE information between an RE 1 and an RE 2. The RE information can be transmitted and received via an X2-RE interface. FIG. 15 (a) shows an X2-RE configuration request/response and FIG. 15 (b) shows an RE configuration update/response.

Referring to FIG. 15 (a), an RE 1 transmits an X2-RE setup request message to an RE 2 [S1505]. The X2-RE setup request message can include an RE type of the RE 1, APs to which the X2-eAP interface is set, information on a different RE and second RAT configuration information. The RE 2 can transmit an X2-RE setup response message to the RE 1 [S1510]. The X2-RE setup response message can include RE type information of the RE 2, second RAT configuration information of an AP to which the X2-eAP interface is set.

Referring to FIG. 15 (b), the RE 1 transmits an RE configuration update message to the RE 2 after RE information of the RE 1 is changed [S1515]. The RE 2 transmits an RE configuration update acknowledge message to the RE 1 [S1520].

Figure 17:
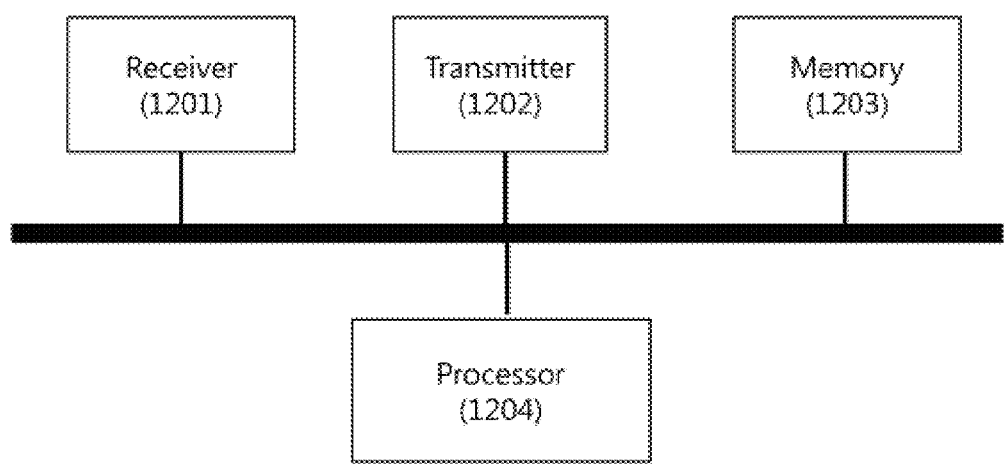
FIG. 17 is a diagram for a radio entity according to one embodiment of the present invention.

FIG. 17 shows an RE according to one embodiment of the present invention. In the description described for the aforementioned methods, an operation of an RE can be comprehended as being performed by an RE shown in FIG. 17 and explanation on overlapped parts is omitted. And, it is apparent that those skilled in the art can understand a hardware configuration configured to perform each steps of the method based on the aforementioned explanation and the attached drawings.

Referring to FIG. 17, an RE includes a receiver 1201, a transmitter 1202, a memory 1203 and a processor 1204. It may further include common configuration elements not depicted in the drawing. To prevent the point of present invention from getting vaguer, the common configuration elements are omitted.

The transmitter 1202 transmits a first message including a list of RE areas covered by an RE among a plurality of geographical zones. The first message is transmitted to an AP through an eMME or can be directly transmitted to the AP. In this case, the first message may correspond to an S1-eMME configuration request message or an X2-eAP interface configuration request message. The first message can further include identifier information of an RE and type information of the RE. The type information of the RE can indicate one selected from the group consisting of a first type supporting a first RAT only, a second type supporting both the first RAT and a second RAT, a third type physically connected with APs of the second RAT while supporting the first RAT only and a fourth type physically connected with the APs of the second RAT while supporting both the first RAT and the second RAT.

The receiver 1201 receives a second message including a list of AP areas covered by the APs of the second RAT among a plurality of the geographical zones in response to the first message. The second message can be received via the eMME or can be directly received from the AP. In this case, the second message may correspond to an S1-eMME configuration response message or an X2-eAP interface configuration response message.

The processor 1204 configures an interface with at least one or more APs among the APs of the second RAT based on the list of the AP areas. The processor can select an AP to which the interface is set according to whether or not at least a part of the AP areas are overlapped with RE areas.

If a position of the RE areas or a position of the AP areas is changed, the processor can reconfigure the interface with the APs. For example, if an interface with a first AP is released due to the interface reconfiguration, the processor asks a UE receiving a service from an RE and the first AP to make a measurement report on the first RAT. The processor can indicate the UE to make a handover to a different RE of the first RAT based on the measurement report received from the UE.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, the embodiments of the present invention can be utilized in various mobile communication systems.

What is claimed is:

1. A method of configuring an inter-radio access technology (RAT) interface with an access point (AP) of an IEEE 802.11 based wireless local area network (WLAN) by a radio entity (RE), the RE corresponding to an evolved Node B (eNB) a long term evolution (LTE) based mobile communication system, the method comprising:
transmitting, by the RE, a first message to the AP, the first message being an interface setup request message including an RE identifier and a public land mobile network identifier (PLMN ID);
receiving, by the RE, a second message from the AP in response to the first message, the second message being either an interface setup response message or an interface setup failure message; and
configuring, by the RE, an inter-RAT interface with the AP when the second message is the interface setup response message,
wherein when the second message is the interface setup response message, the second message includes, one or more of a plurality of WLAN IDs including a basic service set identifier (BSSID), a service set identifier (SSID) and a homogenous extended service set identifier (HESSID), WLAN frequency information and WLAN channel number.

2. The method of claim 1, wherein:
the first message further includes a list of entity areas covered by the RE, and the second message further includes AP areas covered by the AP, and
the inter-RAT interface is established according to whether or not at least a part of the AP areas is overlapped with the entity areas.

3. The method of claim 2, wherein the first message further comprises type information of the RE.

4. The method of claim 3, wherein the type information indicates one of:
a first type supporting the LTE only,
a second type supporting both the LTE and the WLAN,
a third type physically connected with APs of the WLAN while supporting the LTE only and a fourth type physically connected with APs of the WLAN while supporting both the LTE and the WLAN.

5. The method of claim 2, further comprising:
reconfiguring the inter-RAT interface according to a change of a position of the RE areas or a position of the AP areas.

6. The method of claim 5, wherein reconfiguring the inter-RAT interface comprises:
if a first area is added to the RE areas, configuring an inter-RAT interface with an AP covering the first area among APs of WLAN; and
if a second area is excluded from the RE areas, releasing an inter-RAT interface with an AP covering the second area among the Aps of WLAN.

7. The method of claim 2, further comprising:
if an inter-RAT interface with a first AP is released due to reconfiguration of the inter-RAT interface, requesting a measurement report on the LTE to a user equipment (UE) receiving a service from the RE and the first AP.

8. The method of claim 7, wherein requesting the measurement report comprises transmitting information on another RE of the LTE to which an inter-RAT interface with the first AP is set to the UE.

9. The method of claim 7, further comprising indicating the UE to make handover to another RE of the LTE based on the measurement report received from the UE.

10. A radio entity (RE) configuring an inter-radio access technology (RAT) interface with an access point (AP) of an IEEE 802.11 based wireless local area network (WLAN), the RE corresponding to an evolved Node B (eNB) of a long term evolution (LTE) based mobile communication system, the RE comprising:
a transmitter to transmit a first message to the AP, the first message being an interface setup request message including an RE identifier and a public land mobile network identifier (PLMN ID);
a receiver to receive a second message from the AP in response to the first message, the second message being either an interface setup response message or an interface setup failure message; and
a processor to configure an inter-RAT interface with the AP when the second message is the interface setup response message,
wherein when the second message is the interface setup response message, the second message includes, one or more of a plurality of WLAN IDs including a basic service set identifier (BSSID), a service set identifier (SSID) and a homogenous extended service set identifier (HESSID), WLAN frequency information and WLAN channel number.

11. The RE of claim 10, wherein:
the first message further includes a list of entity areas covered by the RE, and the second message further includes AP areas covered by the AP, and
the inter-RAT interface is set according to whether or not at least a part of the AP areas is overlapped with the entity areas.

12. The RE of claim 11, wherein the first message further comprises type information of the RE and
wherein the type information indicates one of a first type supporting the LTE only, a second type supporting both the LTE and the WLAN, a third type physically connected with APs of the WLAN while supporting the LTE only and a fourth type physically connected with APs of the WLAN while supporting both the LTE and the WLAN.

13. The RE of claim 11, wherein the processor is configured to reconfigure the inter-RAT interface with the AP according to a change of a position of the RE areas or a position of the AP areas.

14. The RE of claim 11, wherein the processor is configured to request a measurement report on the LTE to a user equipment (UE) receiving a service from the RE and a first AP, if an inter-RAT interface with the first AP is released due to reconfiguration of the inter-RAT interface.

15. The RE of claim 14, wherein the processor is configured to indicate the UE to make handover to another of the LTE based on the measurement report received from the UE.

16. The method of claim 1, wherein when the second message is the interface setup response message, the second message includes WLAN operating class.

17. The method of claim 16, further comprising:
receiving, from the AP by the RE, an AP configuration update message for updating inter-RAT interface configuration; and
transmitting, by the RE, an AP configuration update acknowledge message to the AP.

* * * * *